No. 810,622. PATENTED JAN. 23, 1906.
J. U. CORNELISON.
AGRICULTURAL IMPLEMENT.
APPLICATION FILED SEPT. 8, 1905.
2 SHEETS—SHEET 1.
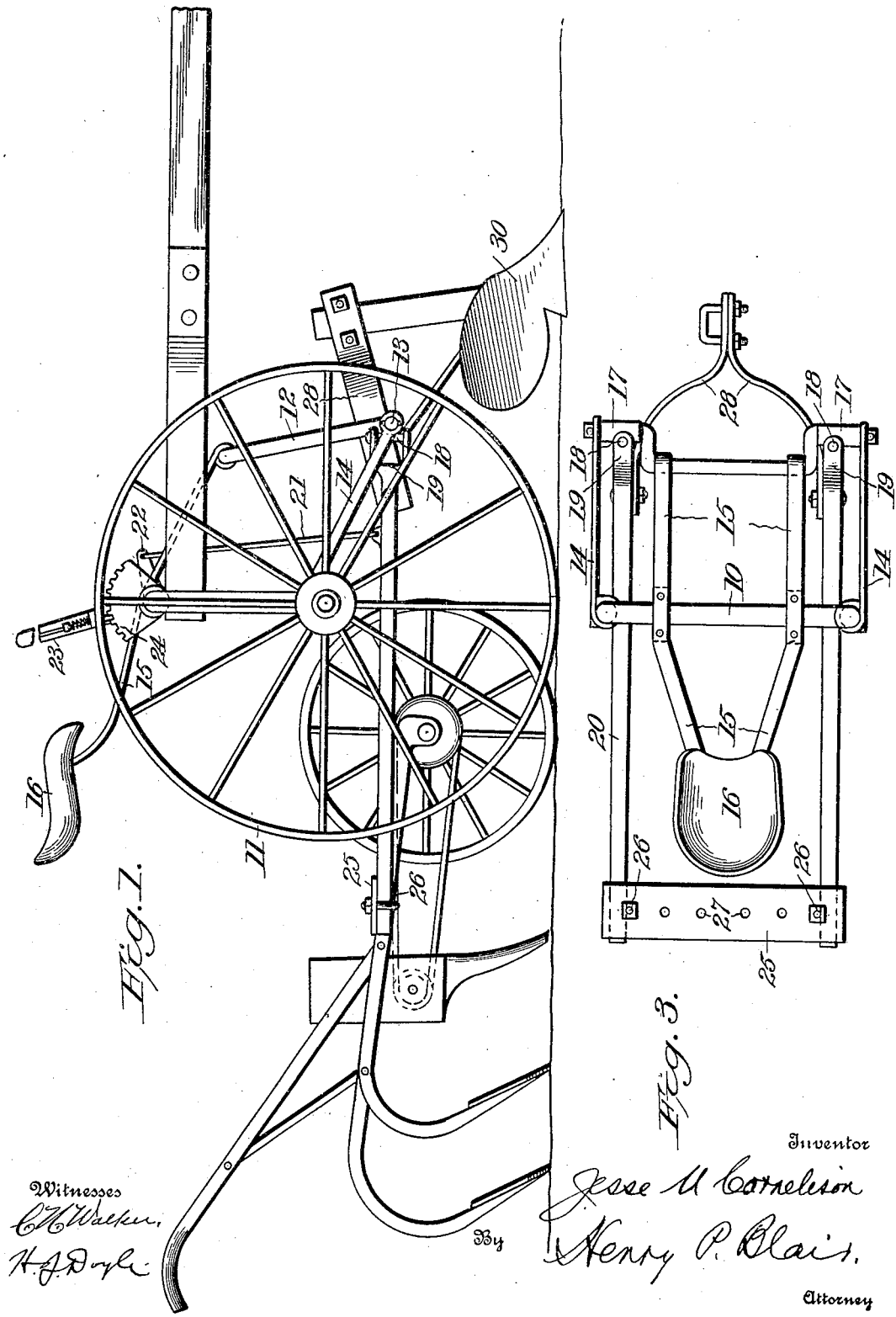
Witnesses
Inventor
Jesse U. Cornelison
By Henry P. Blair
Attorney No. 810,622. PATENTED JAN. 23, 1906.
J. U. CORNELISON.
AGRICULTURAL IMPLEMENT.
APPLICATION FILED SEPT. 8, 1905.
2 SHEETS—SHEET 2.
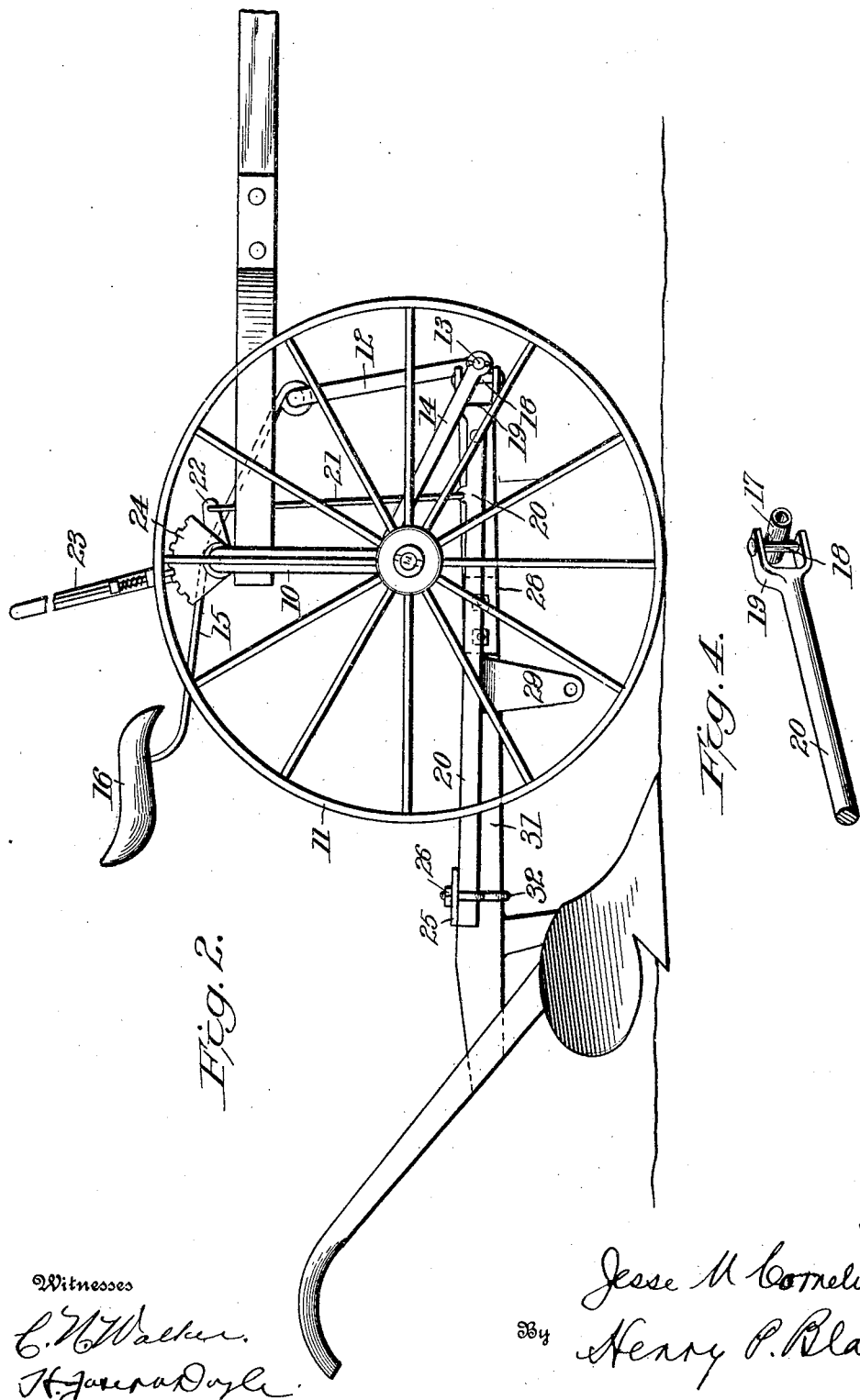
Witnesses
Inventor
Jesse M. Cornelison
By Henry P. Blair
Attorney

UNITED STATES PATENT OFFICE.

JESSE U. CORNELISON, OF EULA, TEXAS.

AGRICULTURAL IMPLEMENT.

No. 810,622.  Specification of Letters Patent.  Patented Jan. 23, 1906.

Application filed September 8, 1905. Serial No. 277,538.

*To all whom it may concern:*

Be it known that I, JESSE U. CORNELISON, a citizen of the United States, residing at Eula, in the county of Callahan and State of Texas, have invented new and useful Improvements in Agricultural Implements, of which the following is a specification.

This invention relates to certain new and useful improvements in agricultural implements; and the invention has for its object the production of simple and inexpensive means whereby the ordinary farming implements—such as plows, cultivators, and the like—may be readily converted to the sulky or wheeled type.

The invention will be hereinafter fully described, and particularly set forth in the claims.

In the accompanying drawings, Figure 1 is a side elevation illustrating my invention with a planter attached thereto, together with the necessary plow for opening the furrow. Fig. 2 is a similar view with a plow attached. Fig. 3 is a plan view of the sulky-frame detached. Fig. 4 is a detail.

Referring to the drawings, 10 designates a U-shaped frame-bar provided with axles upon which the carrying-wheels 11 are mounted. A short distance in advance of bar 10 is a second U-shaped bar 12 of smaller dimensions, said bar being provided with lateral arms 13, the free ends of which are supported in brace-rods 14, carried by the side members of bar 10. The central or yoke portion of bar 12 is also held by brace-rods 15, extending to the corresponding portion of rod 10, said brace-rods being extended to form a support for the driver's seat 16, as shown. On the arms 13 of bar 12 are loosely mounted sleeves 17, carrying rods 18, which extend at right angles to said sleeves, the ends of said rods being arranged to enter eyes of yoke-bars 19, carried by the forward ends of the side bars 20. In this manner said side bars are so mounted as to have a practically universal movement. The free ends of the side bars 20 are prevented from dragging by means of links 21 engaging said bars in any suitable manner, the opposite ends of said links being connected each to an arm or extension 22 of a lever 23. Said lever is of the usual quadrant type and is provided with a catch to engage a rack-bar 24, whereby said side bars may be adjusted vertically. The free ends of the side bars 20 are connected by a cross-bar 25, in the ends of which are mounted clamps 26, adapted to engage said side bars, whereby the position of said cross-bar may be regulated. Said cross-bar is also provided with a plurality of holes or openings 27. Interposed between the forward ends of the side bars 20 are two converging curved bars 28, the free ends of said bars being provided with bolts or the like, whereby they may be clamped together. Said bars are pivotally supported. The draft-tongue is secured, preferably, to the side members of frame-bar 10, and, if desired, the side bars 20 may be provided with depending ears 29 to support a reel or the like when the implement is employed to operate a chopper or other similar instrument.

In the drawings I have illustrated my improved device as arranged to support a planter. In adapting the invention for this use the furrow-opener or plow 30 is supported by the bars 28, while the planter is secured to the cross-bar 25 by means of clamps passing through the holes 27. In adapting my invention to operate a plow the bars 28 are reversed and the plow-beam 31 secured therebetween, the rear end of said beam being secured to the cross-bar 25 by means of a clamp 32.

The advantages of my invention will be at once apparent to those skilled in the art to which it appertains. It will be noted that by means thereof the ordinary farming implements—such as the plow, &c.—may be readily transformed to the sulky or wheeled type with but little trouble, and the advantage of this class of inventions is thereby gained without the vast outlay required to purchase implements of this type. It will also be particularly noted that while I have shown and described my invention as applicable to a planter and a plow I do not limit myself in this particular, as the same is equally applicable to any instrument that may be secured thereto, such as cultivators, choppers, and the like.

I claim as my invention—

1. The herein-described agricultural implement comprising a frame formed of U-shaped frame-bars, carrying-wheels mounted upon one of said frame-bars, side bars connected to the other frame-bar, a cross-bar secured to the free ends of said side bars, and converging bars mounted between the forward ends of said side bars, said converging bars being reversible and coöperating with said cross-bar to interchangeably secure various agricultural implements between said side bars.

2. The herein-described agricultural implement comprising a frame provided with side bars supported at their forward ends, a cross-bar secured to the free ends of said side bars, and converging bars mounted between the forward ends of said side bars, said converging bars being reversible, and coöperating with said cross-bar to interchangeably secure various agricultural implements between said side bars.

3. The herein-described agricultural implement comprising a frame provided with side bars supported at their forward ends, a cross-bar secured to the free ends of said side bars, converging bars pivotally mounted between the forward ends of said side bars, whereby the same may be reversed, and means for holding said converging bars from pivotal movement, said converging bars coöperating with said cross-bar to interchangeably secure various agricultural implements between said side bars.

4. The herein-described agricultural implement comprising a frame provided with side bars supported at their forward ends by an approximately universal joint, a cross-bar secured to the free ends of said side bars, and converging bars mounted between the forward ends of said side bars, said converging bars being reversible, and coöperating with said cross-bar to interchangeably secure various agricultural implements between said side bars.

5. The herein-described agricultural implement comprising a frame provided with side bars supported at their forward ends by an approximately universal joint, means for adjusting said side bars vertically, a cross-bar uniting the free ends of said side bars, and converging bars mounted between the forward ends of said side bars, said converging bars being reversible, and coöperating with said cross-bar to interchangeably secure various agricultural implements between said bars.

In testimony whereof I affix my signature in presence of two subscribing witnesses.

JESSE U. CORNELISON.

Witnesses:
OTIS BOWYER,
T. E. THORNTON.